US010250121B2

(12) United States Patent
Hirota et al.

(10) Patent No.: US 10,250,121 B2
(45) Date of Patent: Apr. 2, 2019

(54) CONVERTER AND CONTROL CIRCUIT

(71) Applicants: Sumitomo Electric Industries, Ltd., Osaka-shi (JP); Sumitomo Wiring Systems, Ltd., Yokkaichi-shi (JP); AutoNetworks Technologies, Ltd., Yokkaichi-shi (JP)

(72) Inventors: Masayoshi Hirota, Osaka (JP); Tatsuya Izumi, Osaka (JP); Keiji Tashiro, Osaka (JP)

(73) Assignees: Sumitomo Electric Industries, Ltd., Osaka-shi (JP); Sumitomo Wiring Systems, Ltd., Yokkaichi-shi (JP); Autonetworks Technologies, Ltd., Yokkaichi-shi (JP)

( * ) Notice: Subject to any disclaimer, the term of this patent is extended or adjusted under 35 U.S.C. 154(b) by 0 days.

(21) Appl. No.: 15/550,704

(22) PCT Filed: Feb. 9, 2016

(86) PCT No.: PCT/JP2016/053824
§ 371 (c)(1),
(2) Date: Aug. 11, 2017

(87) PCT Pub. No.: WO2016/129592
PCT Pub. Date: Aug. 18, 2016

(65) Prior Publication Data
US 2018/0026520 A1  Jan. 25, 2018

(30) Foreign Application Priority Data

Feb. 13, 2015 (JP) ................................. 2015-026518

(51) Int. Cl.
*H02M 1/42* (2007.01)
*H02M 1/14* (2006.01)
(Continued)

(52) U.S. Cl.
CPC .............. *H02M 1/14* (2013.01); *H02M 1/08* (2013.01); *H02M 1/15* (2013.01); *H02M 1/4208* (2013.01);
(Continued)

(58) Field of Classification Search
CPC ......... G05F 1/70; H02M 1/42; H02M 1/4208; H02M 1/4233
See application file for complete search history.

(56) References Cited

U.S. PATENT DOCUMENTS 6,330,170 B1 * 12/2001 Wang ...................... H02J 9/062
363/17
9,762,133 B2 * 9/2017 Handa ............... H02M 3/33546

FOREIGN PATENT DOCUMENTS

| JP | 2009-213202 A | 9/2009 |
| JP | 2009-232502 A | 10/2009 |
| WO | 2015/002088 A1 | 1/2015 |

* cited by examiner

*Primary Examiner* — Gary L Laxton
(74) *Attorney, Agent, or Firm* — Baker Botts L.L.P.; Michael A. Sartori

(57) ABSTRACT

A converter comprises: a preceding converter having a first switching circuit intermittently outputting current; a capacitor smoothing the current output from the first switching circuit; and a succeeding converter having a second switching circuit to which the current smoothed by the capacitor is intermittently input. The converter converts direct current or alternating current input to the preceding converter and outputs the converted direct current or alternating current from the succeeding converter. A control circuit controls switching of the first and second switching circuits so that an end time point of an output period during which current is output from the first switching circuit has a time difference with a start time point of an input period during which current is input to the second switching circuit.

6 Claims, 12 Drawing Sheets

(51) Int. Cl.
*H02M 1/08* (2006.01)
*H02M 3/335* (2006.01)
*H02M 1/15* (2006.01)
H02M 7/217 (2006.01)
H02M 7/537 (2006.01)
H02J 7/02 (2016.01)
H02M 1/00 (2006.01)
B60L 11/18 (2006.01)

(52) U.S. Cl.
CPC ......... *H02M 1/4225* (2013.01); *H02M 3/335* (2013.01); *B60L 11/1812* (2013.01); *B60L 2210/30* (2013.01); *H02J 7/022* (2013.01); *H02M 1/4233* (2013.01); *H02M 3/33576* (2013.01); *H02M 2001/007* (2013.01)

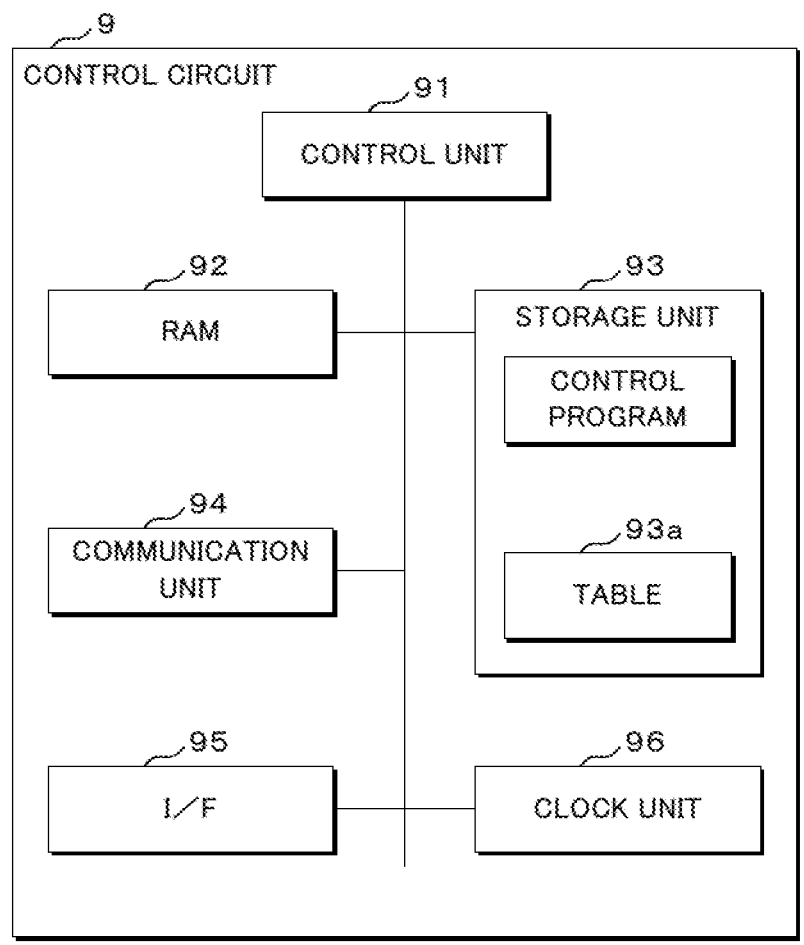
F I G. 2

F I G. 7A
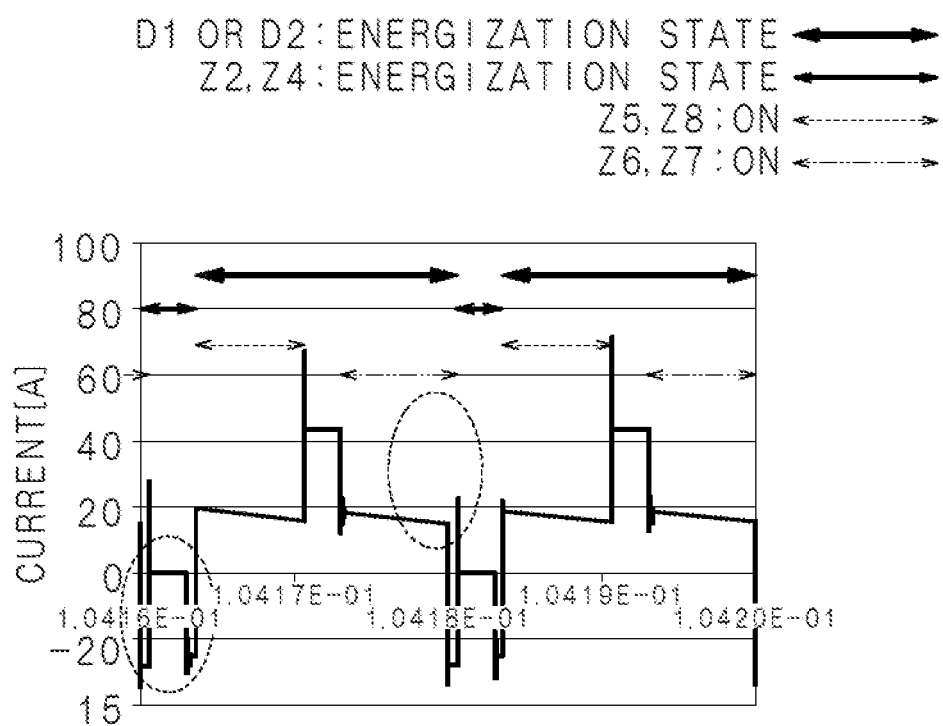

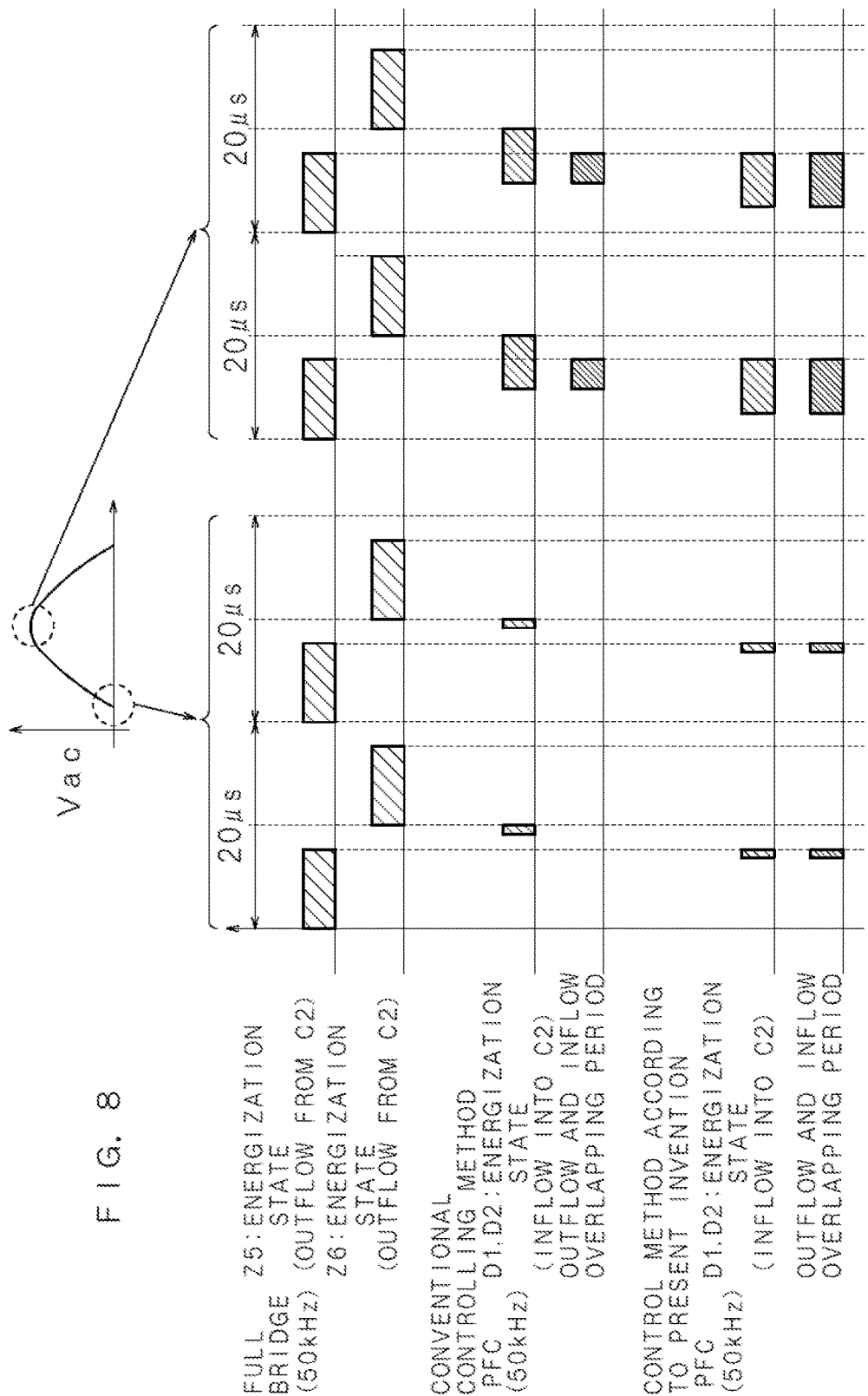

CONVERTER AND CONTROL CIRCUIT

CROSS-REFERENCE TO RELATED APPLICATIONS

This application is the national phase under 35 U.S.C. § 371 of PCT International Application No. PCT/JP2016/053824 which has an International filing date of Feb. 9, 2016 and designated the United States of America.

FIELD

The present disclosure relates to a converter comprising a preceding converter and a succeeding converter that are connected via a capacitor for reducing ripple current, and to a control circuit controlling the operation of the converter.

BACKGROUND

Plug-in hybrid electric vehicles (PHEV) and electric vehicles (EV) mounted with an AC-DC converter that converts alternating-current voltage (hereinafter also referred to as AC voltage) supplied from a commercial power supply for household use into direct-current voltage (hereinafter also referred to as DC voltage) and having a battery charged with the DC voltage converted by the AC-DC converter have been widespread.

Japanese Patent Application Laid-Open Publication No. 2009-213202 discloses an AC-DC converter converting AC voltage into DC voltage. The AC-DC converter comprises an AC-DC converter provided with a power factor correction (PFC) circuit and an insulating DC-DC converter. Between the AC-DC converter with the PFC circuit (hereinafter also referred to as "PFC-added AC-DC converter") and the DC-DC converter, a capacitor for reducing ripple voltage is interposed. The DC-DC converter includes an isolation transformer, a full bridge circuit provided at the preceding stage of the isolation transformer, and a diode bridge provided at the succeeding stage thereof.

The PFC-added AC-DC converter raises and rectifies the AC voltage for the commercial power supply. The voltage rectified at the PFC-added AC-DC converter is converted into the AC voltage of high frequency by the full bridge circuit. The converted AC voltage is converted into DC voltage of battery voltage by the rectifying circuit and the smoothing circuit through the isolation transformer.

SUMMARY

The current flowing into the capacitor is represented by a difference between current output from the PFC-added AC-DC converter at the preceding stage and current input to the DC-DC converter at the succeeding stage. If the difference in current is large, ripple current is also increased, which requires a large volume capacitor. The prior art discloses no specific control method for reducing ripple current through switching control.

It is an object to provide a converter capable of reducing ripple current through switching control and downsizing a capacitor, and a control circuit capable of controlling the operation of the converter.

A converter according to one aspect of the present disclosure comprises: a preceding converter having a first switching circuit intermittently outputting current; a capacitor smoothing the current output from the first switching circuit; and a succeeding converter having a second switching circuit to which the current smoothed by the capacitor is intermittently input, the converter converting direct current or alternating current input to the preceding converter and outputting the converted direct current or alternating current from the succeeding converter, and further comprises a control circuit controlling switching of the first and second switching circuits so that an end time point of an output period during which current is output from the first switching circuit has a time difference with a start time point of an input period during which current is input to the second switching circuit.

A control circuit according to one aspect of the present disclosure controls the operation of a converter comprising: a preceding converter having a first switching circuit intermittently outputting current; a capacitor smoothing the current output from the first switching circuit; and a succeeding converter having a second switching circuit to which the current smoothed by the capacitor is intermittently input, the converter converting direct current or alternating current input to the preceding converter and outputting the converted direct current or alternating current from the succeeding converter, and further controls switching of the first and second switching circuits so that an end time point of an output period during which current is output from the first switching circuit has a time difference with a start time point of an input period during which current is input to the second switching circuit.

It is noted that the present application may be implemented not only as a converter and a control circuit comprising characteristic processing units as described above, but also as a controlling method comprising a step of performing such characteristic processing, or as a program for making a computer execute such a step. The present application may further be implemented as a semiconductor integrated circuit that implements a part or the whole of a converter and a control circuit, or as another system including a converter and a control circuit.

According to the description above, a converter capable of reducing ripple current by switching control and downsizing a capacitor, and a control circuit capable of controlling the operation of the converter may be provided.

The above and further objects and features will more fully be apparent from the following detailed description with accompanying drawings.

BRIEF DESCRIPTION OF THE DRAWINGS

FIG. 2 is a block diagram illustrating a configuration example of a control circuit according to Embodiment 1 of the present disclosure.

FIG. 7A is a graph illustrating an effect of reducing ripple current.

FIG. 8 is timing chart illustrating the flow of current in the case where the PFC-added AC-DC converter and the full bridge circuit have the same driving frequency.

DETAILED DESCRIPTION

Description of Preferred Embodiments

Figure 1:
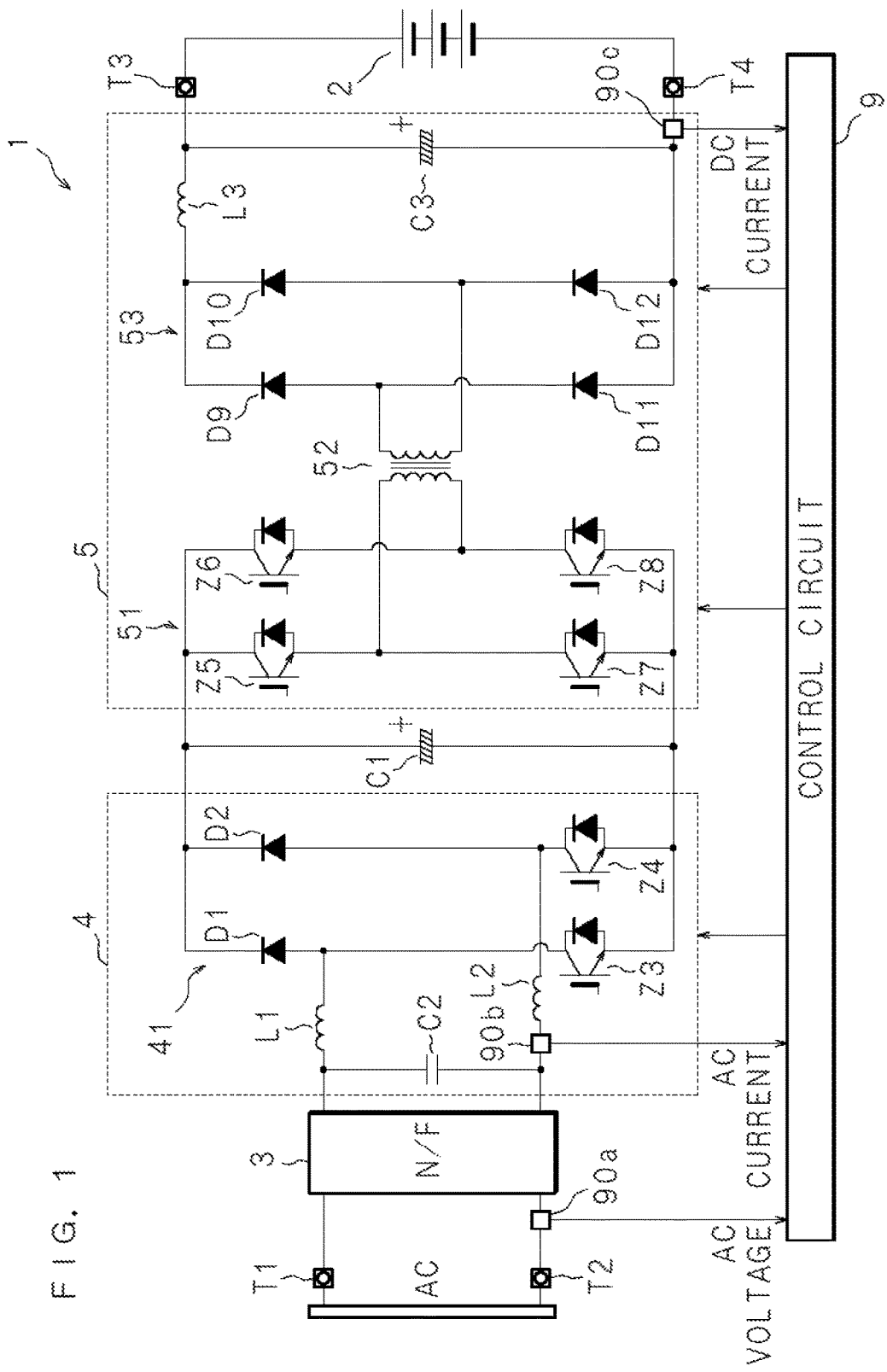
FIG. 1 is a circuit diagram illustrating a configuration example of an AC-DC converter according to Embodiment 1 of the present disclosure.

First, embodiments of the present disclosure will be listed in the following description. At least parts of the embodiments described below may arbitrarily be combined together.

(1) A converter according to one aspect of the present disclosure comprises: a preceding converter having a first switching circuit intermittently outputting current; a capacitor smoothing the current output from the first switching circuit; and a succeeding converter having a second switching circuit to which the current smoothed by the capacitor is intermittently input, the converter converting direct current or alternating current input to the preceding converter and outputting the converted direct current or alternating current from the succeeding converter, and further comprises a control circuit controlling switching of the first and second switching circuits so that an end time point of an output period during which current is output from the first switching circuit has a time difference with a start time point of an input period during which current is input to the second switching circuit.

According to the present application, the control circuit controls switching of the first and second switching circuits so that the end time point of the output period during which current is output from the first switching circuit has a time difference with the start time point of the input period during which current is input to the second switching circuit. In the case where such control is performed, an overlapping period of the output period during which current is output from the first switching circuit and the input period during which current is input to the second switching circuit is longer than that in the case where the end time point matches the start time point. As the overlapping period is elongated, the ripple current is made smaller. Thus, the control circuit may control the overlapping period so as to downsize the capacitor.

The converter includes an AC/AC converter, an AC/DC converter, a DC/AC converter and a DC/DC converter.

(2) The control circuit is preferably be configured to control switching of the first and second switching circuits so that the overlapping period of the output period during which current is output from the first switching circuit and the input period during which current is input to the second switching circuit is maximum.

According to the present application, switching control is so performed that the control circuit has the maximum overlapping period. Accordingly, ripple current is suppressed to the minimum, and the capacitor may be downsized.

(3) The control circuit is preferably configured to control switching of the first and second switching circuits so that the end time point of the output period during which current is output from the first switching circuit substantially matches the end time point of the input period during which current is input to the second switching circuit.

According to the present application, the control circuit controls switching of the first and second switching circuits so that the end time point of the output period during which current is output from the first switching circuit substantially matches the end time point of the input period during which current is input to the second switching circuit. As such, the comparatively simple timing control of switching may control the overlapping period to be the maximum, may suppress ripple current to the minimum and may downsize the capacitor.

(4) The first switching circuit is preferably configured as a power factor improvement circuit, and the second switching circuit is preferably configured as a full bridge circuit for converting direct current into alternating current.

According to the present application, ripple current generated between the power improvement circuit and the full bridge circuit is suppressed, and the capacitor may be downsized.

(5) It is preferably configured that the switching period of one of the first and second switching circuits is an integer multiple of the switching period of the other one of the switching circuits.

According to the present application, the switching period of one of the first and second switching circuits is an integer multiple of the switching period of the other one of the switching circuits. Therefore, the relationship in the switching timing between the first and second switching circuits is maintained, and the overlapping period will not largely vary. Thus, the state where ripple current is reduced may be maintained within a certain range, and the capacitor may be downsized.

(6) A control circuit according to one aspect of the present disclosure controls the operation of a converter comprising: a preceding converter having a first switching circuit intermittently outputting current; a capacitor smoothing the current output from the first switching circuit; and a succeeding converter having a second switching circuit to which the current smoothed by the capacitor is intermittently input, the converter converting direct current or alternating current input to the preceding converter and outputting the converted direct current or alternating current from the succeeding converter, and further controls switching of the first and second switching circuits so that an end time point of an output period during which current is output from the first switching circuit has a time difference with a start time point of an input period during which current is input to the second switching circuit.

According to the present application, as in the mode (1), the control circuit may control the overlapping period so as to downsize the capacitor.

DETAILED DESCRIPTION OF EMBODIMENTS

As a specific example of a converter according to an embodiment of the present disclosure, an AC-DC converter will be described below with reference to the drawings. It is noted that the present disclosure is not limited to the illustration below but is defined by the appended claims, and all changes that fall within metes and bounds of the claims, or equivalence of such metes and bounds thereof are therefore intended to be embraced by the claims.

Embodiment 1

FIG. 1 is a circuit diagram illustrating a configuration example of an AC-DC converter 1 according to Embodiment 1 of the present disclosure. The AC-DC converter 1 according to the present embodiment is an insulation type, which is mounted, for example, to a plug-in hybrid vehicle and an electric vehicle. The AC-DC converter 1 comprises: a noise filter (N/F) 3; a PFC-added AC-DC converter 4; a capacitor C1; an insulation DC-DC converter 5; and a control circuit 9 performing switching control of each converter. The DC-DC converter 5 is constituted by, for example, a full bridge circuit 51, a transformer 52 and a diode bridge 53. The PFC-added AC-DC converter 4 corresponds to the preceding converter in the present embodiment, whereas the DC-DC converter 5 corresponds to the succeeding converter in the present embodiment.

The noise filter 3 comprises the input terminals T1 and T2, whereas the DC-DC converter 5 comprises output terminals T3 and T4. The input terminals T1 and T2 are connected to an alternating current power supply. In the case where AC voltage is applied to the input terminals T1 and T2, the AC voltage is improved in power factor, raised and rectified by the PFC-added AC-DC converter 4. The DC-DC converter 5 converts the voltage rectified at the PFC-added AC-DC converter 4 into AC voltage of high frequency to transform the voltage, rectifies the transformed AC voltage to DC voltage, and outputs the DC voltage through the output terminals T3 and T4. The output terminals T3 and T4 are connected to a battery 2, which is charged by the DC voltage output through the output terminals T3 and T4.

The noise filter 3 is a circuit that removes high frequency noise included in the AC voltage applied to the input terminals T1 and T2, and applies the AC voltage, from which the noise is removed, to the PFC-added AC-DC converter 4.

The PFC-added AC-DC converter 4 is a circuit that raises and rectifies the AC voltage through switching control, while attempting to improve a power factor through switching PWM control. The PFC-added AC-DC converter 4 intermittently outputs the current with the raised voltage. The PFC-added AC-DC converter 4 comprises an input capacitor C2, reactors L1, L2, and two diodes D1 and D2 as well as two switching elements Z3 and Z4 that constitute a bridge circuit for rectification and power factor improvement. The switching elements Z3 and Z4 are power devices such as insulated gate bipolar transistors (IGBT) or metal-oxide semiconductor field effect transistors (MOSFET), for example. In the present embodiment, each of the switching elements Z3 and Z4 will be described below as IGBT. The input terminals of the noise filter 3 are connected to the input terminals T1 and T2, respectively, whereas the output terminals of the noise filter 3 are connected to the respective ends of the input capacitor C2. Moreover, one end of the reactor L1 is connected to one terminal of the output terminal pair, whereas the other end of the reactor L1 is connected to the anode of the diode D1 and to the collector of the switching element Z3. One end of the reactor L2 is connected to the other terminal of the output terminal pair, whereas the other end of the reactor L2 is connected to the anode of the diode D2 and to the collector of the switching element Z4.

The cathodes of the diodes D1 and D2 are connected to the full bridge circuit 51. The anodes of the diodes D1 and D2 are connected to the collectors of the switching elements Z3 and Z4, respectively, whereas the emitters of the switching elements Z3 and Z4 are connected to the full bridge circuit 51.

The reactors L1, L2, the diodes D1, D2, and the switching elements Z3, Z4 constitute a power factor improvement circuit 41. The power factor improvement circuit 41 corresponds to the first switching circuit according to the present embodiment. It is noted that the power factor improvement circuit 41 illustrated in FIG. 1 is a mere example, and another known power factor improvement circuit may also be employed.

One end of the capacitor C1 is connected to the cathodes of the diodes D1 and D2, whereas the other end of the capacitor C1 is connected to the emitters of the switching elements Z3 and Z4.

The capacitor C1 is a circuit that suppresses ripple current by smoothing the voltage output from the PFC-added AC-DC converter 4.

The full bridge circuit 51 in the DC-DC converter 5 is a circuit that converts the voltage output from the PFC-added AC-DC converter 4 via the capacitor C1 into AC voltage through switching control. The full bridge circuit 51 includes four switching elements Z5, Z6, Z7 and Z8 constituting the full bridge circuit 51. The collectors of the switching circuits Z5 and Z6 are connected to the cathodes of the diodes D1 and D2. The emitters of the switching elements Z5 and Z6 are connected to the collectors of the switching elements Z7 and Z8, respectively, whereas the emitters of the switching elements Z7 and Z8 are connected to the emitters of the switching elements Z3 and Z4.

The transformer 52 comprises multiple magnetically-connected coils, e.g., primary and secondary coils. One end of the primary coil is connected to the emitter of the switching element Z5 and the collector of the switching element Z7, whereas the other end of the primary coil is connected to the emitter of the switching element Z6 and the collector of the switching element Z8. When the AC voltage output from the full bridge circuit 51 is applied to the primary coil, alternating magnetic flux is generated at the primary coil, and AC voltage transformed by the alternating magnetic flux is generated at the secondary coil.

The diode bridge 53 is a circuit that full-wave rectifies the AC voltage induced to the secondary coil of the transformer 52. The diode bridge 53 comprises diodes D9, D10, D11 and D12. One end of the secondary coil constituting the transformer 52 is connected to the anode of the diode D9 and the cathode of the diode D11, whereas the other end of the secondary coil is connected to the anode of the diode D10 and the cathode of the diode D12.

The cathodes of the diodes D9 and D10 are connected to one end of the coil L3, whereas the other end of the coil L3 is connected to the output terminal T3. The anodes of the diodes D9 and D10 are connected to the cathodes of the diodes D11 and D12, respectively. The anodes of the diodes D11 and D12 are connected to the output terminal T4. Furthermore, one end of an output capacitor C3 is connected to the other end of the coil L3, whereas the other end of the output capacitor C3 is connected to the anodes of the diodes D11 and D12.

The output capacitor C3 is an element for smoothing the full-wave rectified voltage output from the diode bridge 53. The coil L3 is an element for suppressing the ripple current flowing into the output capacitor C3.

Furthermore, the AC-DC converter 1 comprises an AC voltage detection unit 90a detecting AC voltage input to/output from the PFC-added AC-DC converter 4. The AC voltage detection unit 90a is located on a conductive wire connecting the input terminal T2 to one terminal of one terminal pair of the noise filter 3, and is to output a signal corresponding to voltage on the conductive wire, i.e. AC voltage to be applied to the PFC-added AC-DC converter 4. For example, the AC voltage detection unit 90a is a circuit including a voltage dividing resistor that divides voltage of the conductive wire and outputting the divided voltage to the control circuit 9. It is noted that the divided voltage may be amplified by an amplifier and output to the control circuit 9, or the voltage may be AD converted and the AD-converted voltage value may be output to the control circuit 9.

Moreover, the AC-DC converter 1 comprises an AC current detection unit 90b detecting current input to/output from the PFC-added AC-DC converter 4. The AC current detection unit 90b is located on a conductive wire connecting one terminal of the other terminal pair of the noise filter 3 to the reactor L2, and is to output a signal corresponding to current input to/output from the PFC-added AC-DC converter 4 to the control circuit 9. The AC current detection unit 90b is a circuit including, for example, a current transformer, converting the current transformed by the current transformer into voltage, and outputting the voltage to the control circuit 9.

Moreover, the AC-DC converter 1 comprises a DC current detection unit 90c detecting current input to/output from the battery 2. The DC current detection unit 90c is located on a conductive wire connecting one terminal of the diode bridge 53 to an output terminal T4, and is to output a signal corresponding to current input to/output from the battery 2 to the control circuit 9.

FIG. 2 is a block diagram illustrating a configuration example of the control circuit 9 according to Embodiment 1 of the present disclosure. The control circuit 9 comprises a control unit 91 such as a central processing unit (CPU) controlling the operation of each component in the control circuit 9. The control unit 91 is connected, via a bus, to a RAM 92, a storage unit 93, a communication unit 94, an interface 95, and a clock unit 96 for clocking the timing of switching control.

The storage unit 93 is a non-volatile memory such as an electrically erasable programmable ROM (EEPROM), in which a table 93a and a control program for switching control according to the present embodiment are stored. The table 93a stores therein the switching timing of the PFC-added AC-DC converter 4 and the DC-DC converter 5 in association with the phase and magnitude of AC voltage.

Furthermore, the control program is recorded in a recording medium such a CD (Compact Disc)-ROM, a DVD (Digital Versatile Disc)-ROM or a BD (Blu-ray (registered trademark) Disc), which is a computer-readable portable recording medium, a hard disk drive or a solid state drive. The control unit 91 may read out a control program from a recording medium, and store the control program in the storage unit 93.

It is further possible to obtain a control program according to the present disclosure from an external computer (not illustrated) connected to a communication network through a communication unit 94, and to store the control program in the storage unit 93.

The RAM 92 is a memory such as a DRAM (Dynamic RAM) or an SRAM (Static RAM), which temporarily stores a control program read out from the storage unit 93 at executing the operation processing by the control unit 91 as well as various types of data generated from the operation processing executed by the control unit 91.

The communication unit 94 is a circuit that receives charging instructions for instructing conversion from AC voltage into DC voltage, terminating instructions or the like.

The interface 95 is connected to the gates of the switching elements Z3, Z4, . . . , Z7, Z8 constituting the PFC-added AC-DC converter 4 and the full bridge circuit 51, and performs switching control of each circuit by applying voltage to the gates.

Moreover, the interface 95 is connected to the AC voltage detection unit 90a, the AC current detection unit 90b and the DC current detection unit 90c, and receives inputs of the current and voltage detected at each of the detection units.

In the case of receiving charging instructions by the communication unit 94, the control unit 91 makes the PFC-added AC-DC converter 4 operate as the power factor improvement circuit 41 and the AC-DC conversion circuit, and makes the full bridge circuit 51 operate as the DC-AC conversion circuit through switching control.

Figure 3:
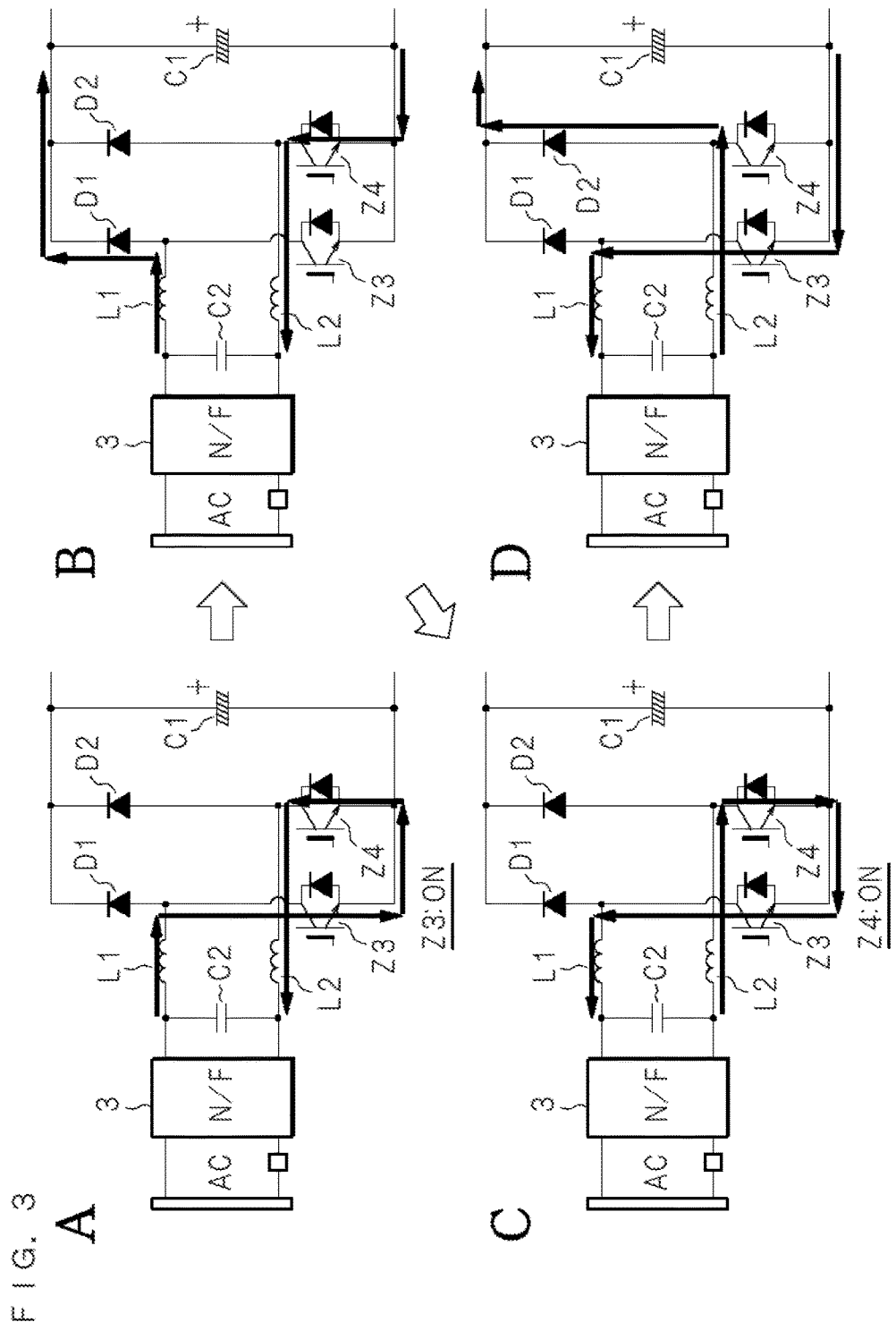
FIG. 3 illustrates an operation example of a PFC-added AC-DC converter.

FIG. 3 illustrates an operation example of the PFC-added AC-DC converter 4. The switching frequency of the PFC-added AC-DC converter 4 is, for example, 50 kHz.

The control unit 91 turns on the switching element Z3 at a specific timing clocked by the clock unit 96. In the case where the AC voltage is positive, as illustrated in FIG. 3A, current flows from the noise filter 3 through the reactor L1 into the switching element Z3 from the collector side to the emitter side. The current flows in the switching element Z4 from the emitter side to the collector side, passes through the reactor L2 to the noise filter 3.

Subsequently, if the AC voltage is positive, the control unit 91 turns off the switching element Z3, as illustrated in FIG. 3B. Here, the current flows from the noise filter 3 through the reactor L1 and the diode D1, and to the positive terminal side of the DC-DC converter 5. Moreover, the current from the negative terminal side of the DC-DC converter 5 flows from the emitter side to the collector side of the switching element Z4, through the reactor L2 to the noise filter 3.

Subsequently, the control unit 91 turns on the switching elements Z3 and Z4 again at a specific timing clocked by the clock unit 96. In a period during which the AC voltage is positive, the switching control illustrated in FIGS. 3A and 3B are alternately executed.

In the case where the switching element Z4 is turned on while the AC voltage is negative, as illustrated in FIG. 3C, current flows from the noise filter 3 through the reactor L2 into the switching element Z4 from the collector side to the emitter side. The current then flows in the switching element Z3 from the emitter side to the collector side, passes through the reactor L1 to the noise filter 3.

If the AC voltage is negative, the control unit 91 turns off the switching element Z4, as illustrated in FIG. 3D. Here, the current flows from the noise filter 3 through the reactor L2 and the diode D2, and to the positive terminal side of the DC-DC converter 5. Moreover, the current from the negative terminal side of the DC-DC converter 5 flows from the emitter side to the collector side of the switching element Z3, through the reactor L1 to the noise filter 3.

Figure 4:
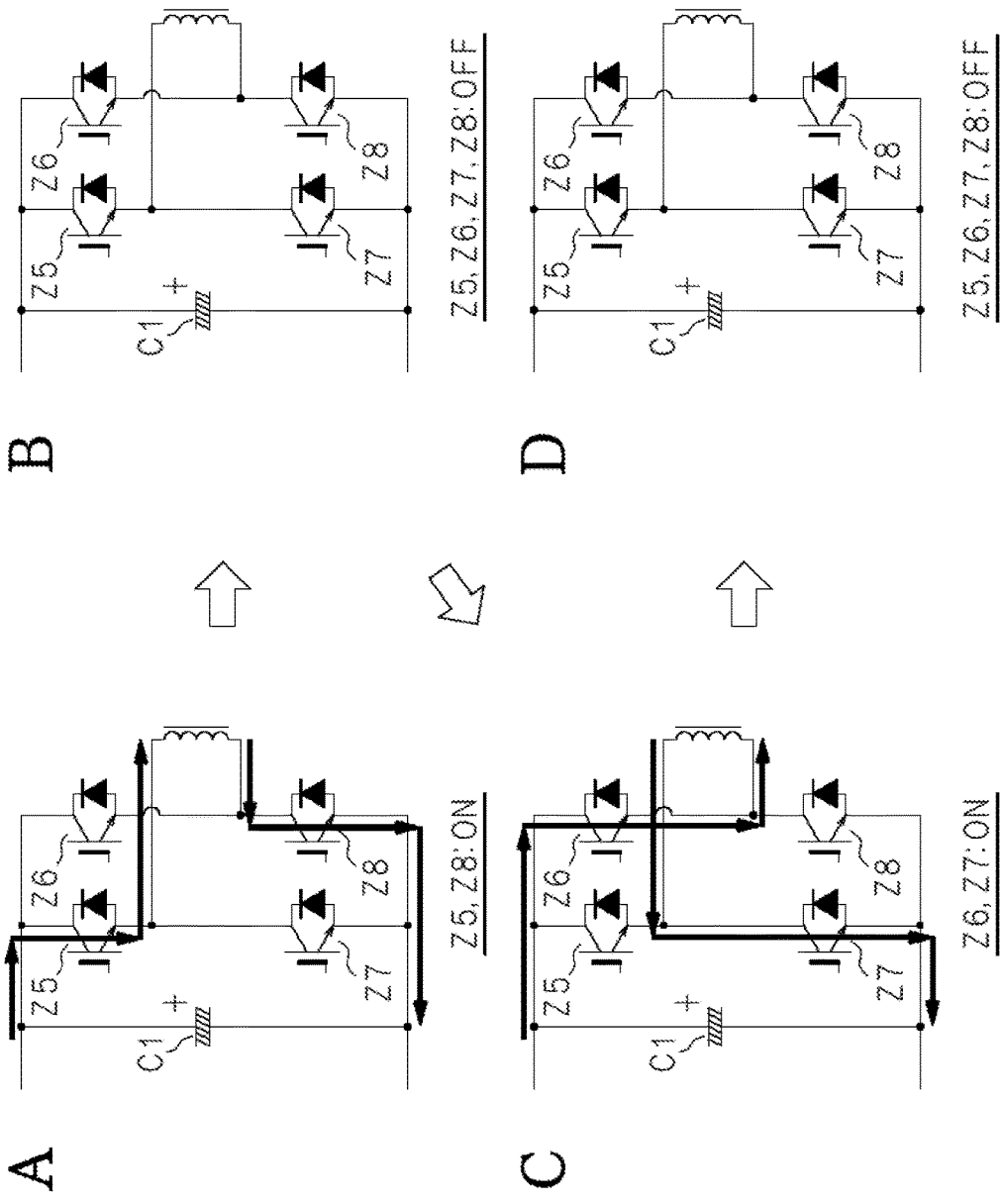
FIG. 4 illustrates an operation example of a full bridge circuit.

FIG. 4 illustrates an operation example of the full bridge circuit 51. The switching frequency of the full bridge circuit 51 is, for example, 50 kHz. The switching frequency of the full bridge circuit 51 is 50 kHz which is the same as the switching frequency of the PFC-added AC-DC converter 4. It is noted that the control unit 91 may perform control such that the switching period of one of the PFC-added AC-DC converter 4 and the full bridge circuit 51 is an integer multiple of the switching period of the other one.

As illustrated in FIG. 4A, the control unit 91 turns on the switching elements Z5 and Z8, and turns off the switching elements Z6 and Z7 at a specific timing clocked by the clock unit 96. The current flows through the switching element Z5, the primary coil of the transformer 52, and the switching element Z8. The current flows through the primary coil in a predetermined direction and the voltage is induced to the secondary coil side.

Subsequently, the control unit 91 turns off the switching elements Z5, Z6, Z7 and Z8 as illustrated in FIG. 4B, and then turns on the switching elements Z6 and Z7 while keeping the switching elements Z5 and Z8 in the OFF state as illustrated in FIG. 4C. The current flows through the switching element Z6, the primary coil of the transformer 52, and the switching element Z7. Current flows through the primary coil in a direction opposite from the predetermined direction, and the voltage is induced to the secondary coil side.

Subsequently, the control unit 91 turns off the switching elements Z5, Z6, Z7 and Z8 as illustrated in FIG. 4D, and then turns on the switching elements Z5 and Z8 while keeping the switching elements Z6 and Z7 in the OFF state again as illustrated in FIG. 4A. Thereafter, similar switching control is performed.

It is noted that the control method illustrated in FIG. 4 is a mere example, and the method of controlling the full bridge circuit 51 is not particularly limited. For example, the full bridge circuit 51 may be controlled by a phase shift method.

Figure 5:
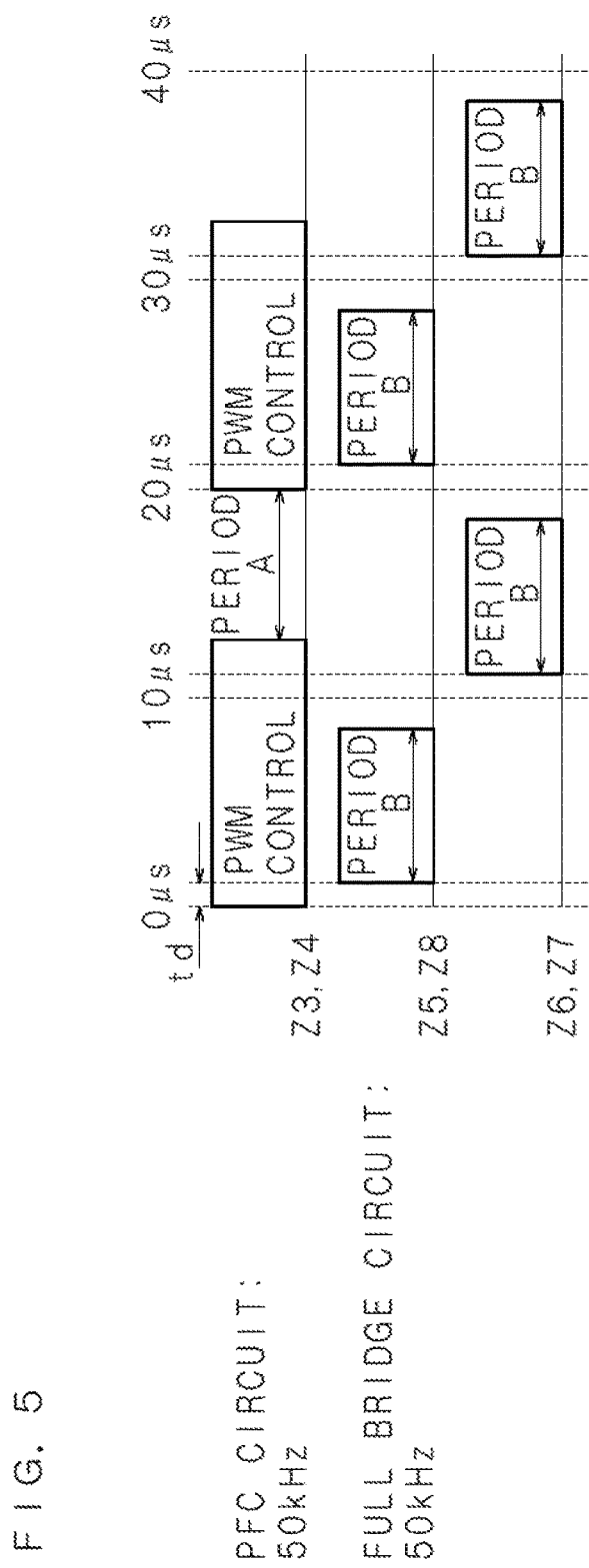
FIG. 5 is a timing chart illustrating a method for switching control.

FIG. 5 is a timing chart illustrating a method for switching control.

The period denoted by "PWM control" in the drawing indicates a period during which the control unit 91 turns on both the switching elements Z3 and Z4 of the PFC-added AC-DC converter 4. In the period, the energy of the AC power supply is stored in the reactors L1 and L2. In the period A, no current is output from the PFC-added AC-DC converter 4 to the capacitor C1.

The period A represents a period during which one of the switching element Z3 and Z4 is in the ON state while the other one of them is in the OFF state. In the period A, current is output from the PFC-added AC-DC converter 4 to the capacitor C1. The voltage output from the PFC-added AC-DC converter 4 is raised by energy stored in the reactors L1 and L2. The length of the period A varies depending on the AC voltage. The control is performed such that the period A is longer if the value of the AC voltage is large, whereas the period A is shorter if the value of the AC voltage is small. Such control improves the power factor.

Meanwhile, a period B represents a period during which the switching elements Z5 and Z8 or the switching elements Z6 and Z7 of the full bridge circuit 51 are in the ON state. In the period B, the AC voltage is output from the full bridge circuit 51, and current flows from the PFC-added AC-DC converter 4 or the capacitor C1 into the full bridge circuit 51.

In the other periods, the switching elements Z5, Z6, Z7 and Z8 of the full bridge circuit 51 are in the OFF state, and no current flows from the PFC-added AC-DC converter 4 or the capacitor C1 to the full bridge circuit 51.

The control unit 91 according to Embodiment 1 performs switching control of the PFC-added AC-DC converter 4 and the full bridge circuit 51 such that a time difference is present between an end time point of the period A during which current is output from the PFC-added AC-DC converter 4 (e.g., time point of 20 [μs]) and a start time point of the period B during which current is input to the full bridge circuit 51 (e.g., 20+td [μs]). Preferably, the control unit 91 performs control such that the overlapping period of the period A and the period B is the maximum. In order to make the overlapping period of the period A and the period B the maximum, switching control may be performed such that the end time point of the period A substantially matches the end time point of the period B. It is noted that the timing information for such switching control is stored in the table 93a in advance, and the control unit 91 may read out timing information stored in the table 93a and perform switching control. The control unit 91 may be configured to calculate the timings as described above and to perform switching control without the use of the table 93a. Moreover, a switch driving circuit may also be included that outputs a signal for turning on or off each of the switching elements Z3, Z4, Z5, Z6, Z7 and Z8 at the timing as described above.

The overlapping period of the period A and the period B may be controlled by adjusting time td from the timing for turning on the switching elements Z3 and Z4 of the PFC-added AC-DC converter 4 to the timing for turning on the switching elements Z5 and Z8 or the switching elements Z6 and Z7 of the full bridge circuit 51.

Figure 6:
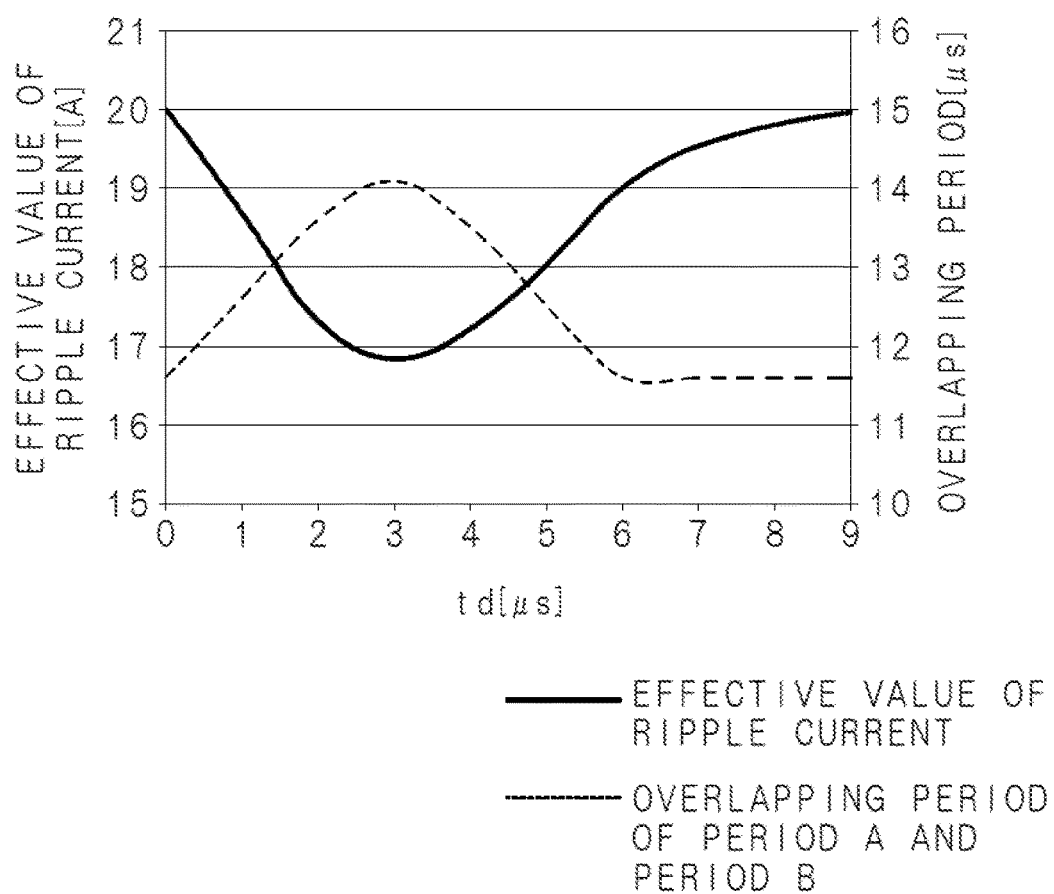
FIG. 6 is a graph illustrating the relationship between an effective value of ripple current and an overlapping period of a period A and a period B.

FIG. 6 is a graph illustrating the relationship between the effective value of ripple current between the overlapping period of the period A and the period B. The horizontal axis indicates the time td, the vertical axis on the left side indicates the effective value of ripple current, and the vertical axis on the right side indicates the length of the overlapping period of the period A and the period B. As td is increased, the overlapping period of the period A and the period B is made longer, which reduces the effective value of ripple current. However, if td exceeds a certain value, the overlapping period of the period A and the period B is shortened on the other hand, which increases the effective value of ripple current. The effective value of ripple current is minimized when the overlapping period of the period A and period B is the maximum. While the period A corresponds to a constantly-varying value, the overlapping period of the period A and the period B is made the maximum if the end time point of the period A substantially matches the end time point of the period B. In other words, the control unit 91 performs switching control such that the end time point of the output period during which current is output from the PFC-added AC-DC converter 4 substantially matches the end time point of the input period during which current is input to the full bridge circuit 51.

Figure 7B:
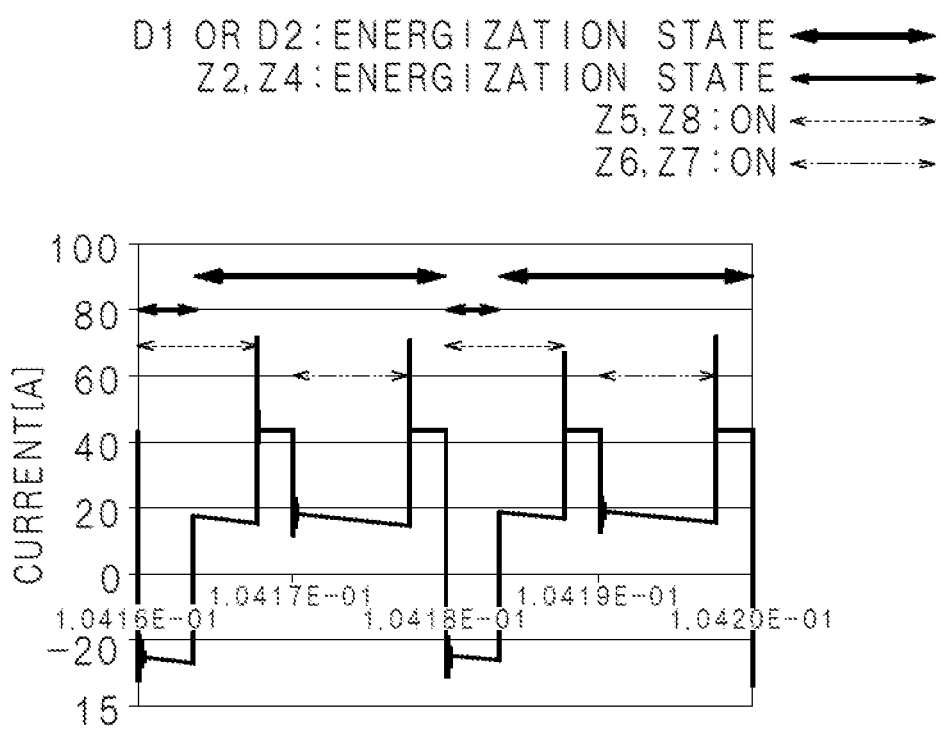
FIG. 7B is a graph illustrating an effect of reducing ripple current.

FIGS. 7A and 7B are graphs illustrating effects of reducing ripple current. The horizontal axis indicates time, whereas the vertical axis indicates ripple current flowing in and out of the capacitor C1. FIG. 7A illustrates ripple current in the case where control is performed such that the overlapping period of the period A and the period B is maximized. FIG. 7B illustrates ripple current in the case where the control according to Embodiment 1 is not performed, i.e., where td=0. Comparing the portions indicated by ellipses of broken lines in FIG. 7A with FIG. 7B, it can be seen that the current flowing into the capacitor C1 or the current flowing out of the capacitor C1 is reduced.

FIG. 8 is a timing chart illustrating the flow of current in the case where the PFC-added AC-DC converter 4 and the full bridge circuit 51 have the same driving frequency. In the example illustrated in FIG. 8, the PFC-added AC-DC converter 4 and the full bridge circuit 51 have the driving frequency of 50 kHz. The horizontal axis indicates time.

The two timing charts at the top illustrate the energization state of the switching elements Z5 and Z8 and the energization state of the switching elements Z6 and Z7, respectively, in the full bridge circuit 51. The rectangular hatched portions indicate the timing at which the current flows out from the capacitor C1 side to the full bridge circuit 51.

The two timing charts at the middle represent the energization state of the diode D1 or diode D2 in the case where the PFC-added AC-DC converter 4 is controlled by the conventional method, and the overlapping period. The overlapping period is a period where a period during which the diode D1 or D2 is energized overlaps with a period during which the switching elements Z5, Z6, Z7, Z8 are energized.

The two timing charts at the bottom represent the energization state of the diode D1 or D2 and the overlapping period in the case where the PFC-added AC-DC converter 4 is controlled by the control method according to Embodiment 1.

As can be seen from the timing charts at the middle and the bottom, by the switching control according to Embodiment 1, the overlapping period of the period during which current is output from the PFC-added AC-DC converter 4 and the period during which current is input to the full bridge circuit 51 is longer than that in the conventional method. If the difference between the current flowing from the PFC-added AC-DC converter 4 into the capacitor C1 and the current flowing out from the capacitor C1 to the full bridge circuit 51 is increased, the ripple current is also increased. The switching control according to Embodiment 1 can reduce the difference as a whole, and thus can also reduce ripple current. By reducing the ripple current, the capacitor C1 may be downsized.

Figure 9:
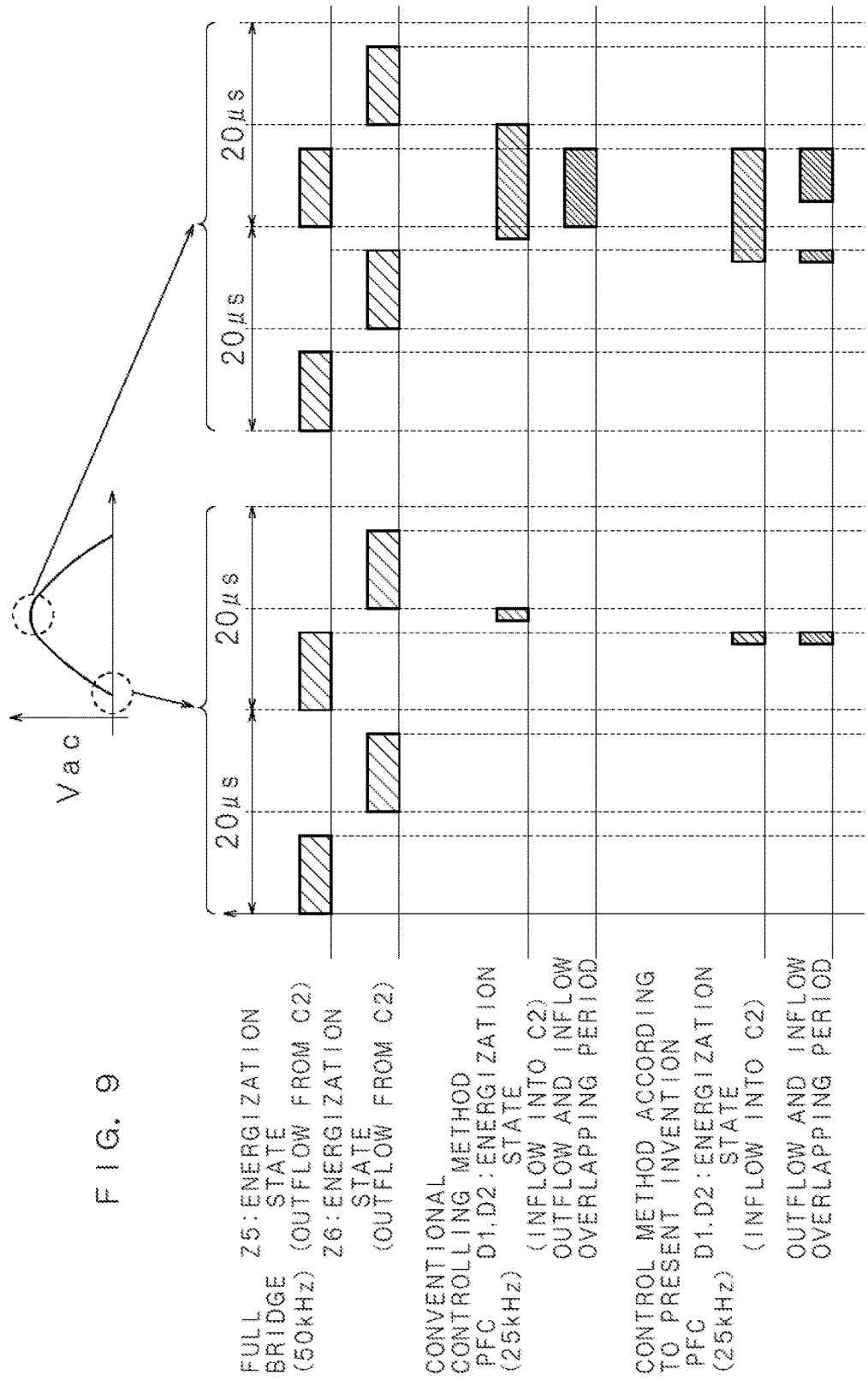
FIG. 9 is a timing chart illustrating the flow of current in the case where the drive frequency of the PFC-added AC-DC converter is half the drive frequency of the full bridge circuit.

FIG. 9 is a timing chart illustrating the flow of current in the case where the drive frequency of the PFC-added AC-DC converter 4 is half the drive frequency of the full bridge circuit 51. In the example illustrated in FIG. 9, the PFC-added AC-DC converter 4 has the drive frequency of 50 kHz, whereas the full bridge circuit 51 has the driving frequency of 25 kHz. The horizontal axis indicates time.

The timing charts at the top, middle and bottom are similar to those in FIG. 8, except for the drive frequency of the PFC-added AC-DC converter 4. Even if the drive frequency of the PFC-added AC-DC converter 4 is half the drive frequency of the full bridge circuit 51, the ripple current may be suppressed and the capacitor C1 may be downsized by extending the overlapping period to be longer compared to the conventional method.

Moreover, as can be seen from FIG. 9, the overlapping period only varies in a regular manner at the frequency of 25 kHz, except for the periodic variations in the ON period of the switching elements Z3 and Z4. Therefore, it is sufficient to specify the capacitance required for the capacitor C1 in the range of the overlapping period that varies regularly.

Figure 10:
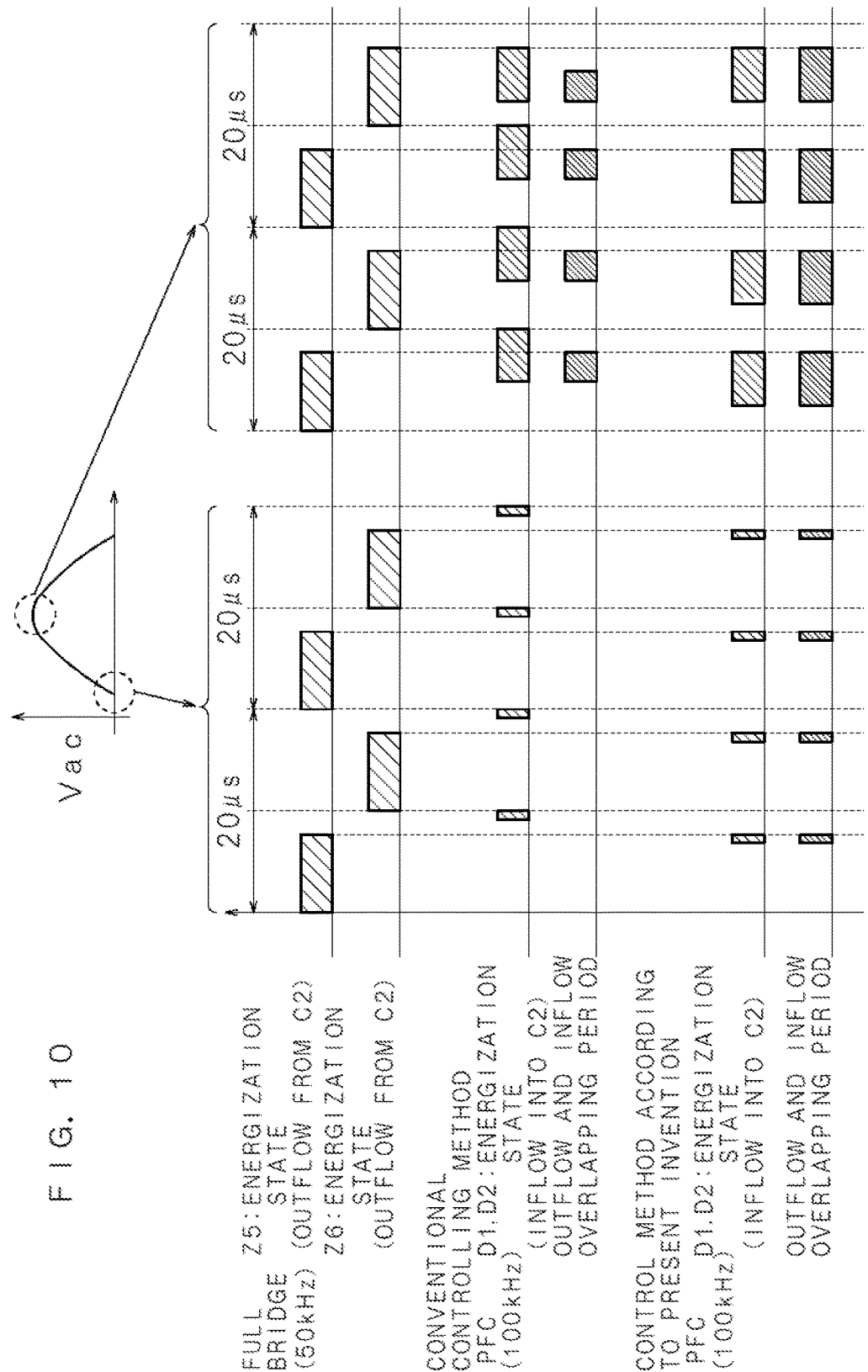
FIG. 10 is a timing chart illustrating the flow of current in the case where the drive frequency of the PFC-added AC-DC converter is twice the drive frequency of the full bridge circuit.

FIG. 10 is a timing chart illustrating the flow of current in the case where the drive frequency of the PFC-added AC-DC converter 4 is twice the drive frequency of the full bridge circuit 51. In the example illustrated in FIG. 9, the PFC-added AC-DC converter 4 has the drive frequency of 50 kHz, whereas the full bridge circuit 51 has the driving frequency of 100 kHz. The horizontal axis indicates time.

The timing charts at the top, middle and bottom are similar to those in FIG. 8, except for the drive frequency of the PFC-added AC-DC converter 4. Even if the drive frequency of the PFC-added AC-DC converter 4 is twice the drive frequency of the full bridge circuit 51, the ripple current may be suppressed and the capacitor C1 may be downsized by extending the overlapping period to be longer compared to the conventional method. Moreover, as can be seen from FIG. 10, the overlapping period only varies in a regular manner at the frequency of 100 kHz, except for the periodic variations in the ON period of the switching elements Z3 and Z4. Therefore, it is sufficient to specify the capacitance required for the capacitor C1 in the range of the overlapping period that varies regularly.

As described above, according to Embodiment 1, the switching control can reduce the ripple current between the PFC-added AC-DC converter 4 and the full bridge circuit 51 constituting the DC-DC converter 5, and can downsize the capacitor C1.

Since the control circuit 9 performs switching control such that the overlapping period of the period A and the period B is the maximum, ripple current is suppressed to the minimum, and the capacitor may be downsized.

Furthermore, the control circuit 9 performs switching control such that the end time point of the period A substantially matches the end time point of the period B, which may make the overlapping period maximum by relatively simple timing control of switching.

In addition, since the switching period of either one of the PFC-added AC-DC converter 4 and the full bridge circuit 51 is an integer multiple of the other one of them, the state where the ripple current is reduced may be held in a certain range, allowing the capacitor to be smaller.

Embodiment 2

Figure 11:
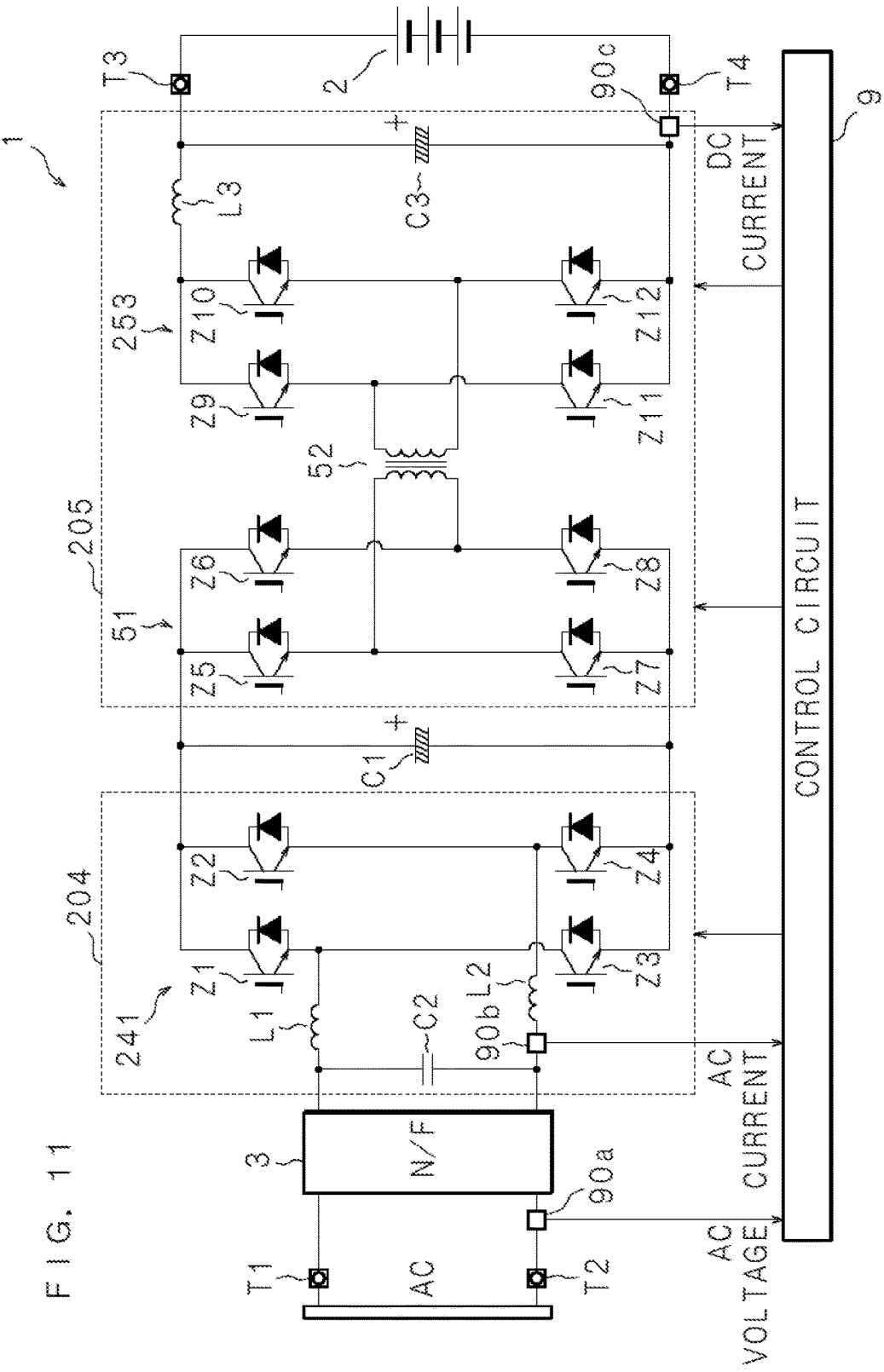
FIG. 11 is a circuit diagram illustrating a configuration example of an AC-DC converter according to Embodiment 2 of the present disclosure.

FIG. 11 is a circuit diagram illustrating a configuration example of an AC-DC converter 1 according to Embodiment 2 of the present disclosure. The AC-DC converter 1 according to Embodiment 2 is configured similarly to the AC-DC converter 1 concerning Embodiment 1, whereas the power improvement circuit 241 in the PFC-added AC-DC converter 204 and the DC-DC converter 205 are configured differently from those in Embodiment 1. The following description mainly discusses the differences.

The PFC-added AC-DC converter 204 according to Embodiment 2 is a circuit that bi-directionally converts the AC voltage and DC voltage through switching control. The PFC-added AC-DC converter 204 comprises an input capacitor C2 as well as reactors L1 and L2 as in Embodiment 1, the reactors L1 and L2 connected to a PFC full-bridge circuit configured by switching elements Z1, Z2, Z3 and Z4. One end of the reactor L1 is connected to the noise filter 3, whereas the other end of the reactor L1 is connected to the emitter of the switching element Z1 and to the collector of the switching element Z3. One end of the reactor L2 is connected to the noise filter 3, whereas the other end of the reactor L2 is connected to the emitter of the switching element Z2 and to the collector of the switching element Z4. The collectors of the switching elements Z1 and Z2 are connected to the full bridge circuit 51. The emitters of the switching elements Z1 and Z2 are connected to the collectors of the switching elements Z3 and Z4, respectively, whereas the emitters of the switching elements Z3 and Z4 are connected to the full bridge circuit 51.

The DC-DC converter 205 according to Embodiment 2 is a circuit for bidirectional AD-AD conversion. The DC-DC converter 205 comprises a first full bridge circuit 51, a transformer 52 and a second full bridge circuit 253 that are similar to those in Embodiment 1. The first full bridge circuit 51 and the second full bridge circuit 253 are configured similarly to those in Embodiment 1, and are connected to the respective coils constituting the transformer 52. The second full bridge circuit 253 is a circuit that replaces the diodes D9, D10, D11 and D12 of the diode bridge 53 in Embodiment 1 with the switching elements Z9, Z10, Z11 and Z12.

The control unit 91 performs switching control of the switching elements Z1, Z2, Z3 and Z4 of the PFC-added AC-DC converter 204 so as to allow the current to flow as illustrated in FIG. 3 when charging the battery 2. That is, in the state illustrated in FIG. 3A, the switching element Z3 is turned on. In the state illustrated in FIG. 3B, the switching element Z3 is turned off. In the state illustrated in FIG. 3C, the switching element Z4 is turned on. In the state illustrated in FIG. 3D, the switching element Z4 is turned off.

Furthermore, the control unit 91 performs switching control of the switching elements Z9, Z10, Z11 and Z12 of the second full bridge circuit 253 such that the voltage induced by the secondary coil of the transformer 52 through the control as illustrated in FIG. 4 is rectified when charging the battery 2. For example, in the state illustrated in FIG. 4A, the switching elements Z10 and Z11 are turned off. In the state illustrated in FIG. 4C, the switching elements Z9 and Z12 are turned off. In the state illustrated in FIGS. 4B and 4D, the switching elements Z9, Z10, Z11 and Z12 are turned off.

In the case of discharging the battery 2, the control unit 91 performs switching control for the PFC-added AC-DC converter 204 and the DC-DC converter 205 so that the PFC full bridge circuit functions as an inverter, to convert the voltage output from the DC-DC converter 205 into AC voltage which is to be output.

In the case where a load is connected to the input terminals T1 and T2, the DC voltage applied to the output terminals T3 and T4 by the battery 2 is AC-DC converted, and the AC-DC converted alternating current is supplied to the load via the input terminals T1 and T2. By the AC-DC converter 1 which performs bidirectional AC-DC conversion on the AC voltage and the DC voltage being mounted in a vehicle, the battery 2 may be utilized as a power supply in case of disaster or emergency.

Even in the bidirectional AC-DC converter 1 according to Embodiment 2 configured as described above, the switching control can reduce the ripple current between the PFC-added AC-DC converter 204 and the DC-DC converter 205, and can downsize the capacitor C1, as in Embodiment 1.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A converter comprising:
a preceding-converter having a first switching circuit intermittently outputting current;
a capacitor smoothing the current output from the first switching circuit;
a succeeding-converter having a second switching circuit to which the current smoothed by the capacitor is intermittently input; and
a control circuit controlling switching of the first and second switching circuits so that an end time point of an output period during which current is output from the first switching circuit substantially matches an end time point of an input period during which current is input to the second switching circuit, wherein
the converter converting direct current or alternating current input to the preceding-converter and outputting the converted direct current or alternating current from the succeeding-converter.

2. The converter according to claim 1, wherein
the first switching circuit is a power factor improvement circuit, and the second switching circuit is a full bridge circuit for converting direct current into alternating current.

3. The converter according to claim 1, wherein
a switching period of one of the first and second switching circuits is an integer multiple of a switching period of the other one of the first and second switching circuits.

4. A control circuit controlling operation of a converter, the converter comprising:
a preceding-converter having a first switching circuit intermittently outputting current;
a capacitor for smoothing the current output from the first switching circuit; and
a succeeding-converter having a second switching circuit to which the current smoothed by the capacitor is intermittently input, the converter converting direct current or alternating current input to the preceding-converter and outputting the converted direct current or alternating current from the succeeding-converter, wherein
the control circuit controls switching of the first and second switching circuits so that an end time point of an output period during which current is output from the first switching circuit substantially matches an end time point of an input period during which current is input to the second switching circuit.

5. A converter comprising:
a power factor correction (PFC)-added AC-DC-converter having a power factor improvement circuit intermittently outputting current which raises and rectifies AC voltage, while improving a power factor through switching pulse width modulation (PWM) control;
a capacitor smoothing the current output from the power factor improvement circuit;
a succeeding-converter having a full bridge circuit to which the current smoothed by the capacitor is intermittently input; and
a control circuit controlling switching of the power factor improvement circuit and the full bridge circuit so that an end time point of an output period during which current is output from the power factor improvement circuit has a time difference with a start time point of an input period during which current is input to the full bridge circuit,
the output period is longer if a value of the AC voltage is large, whereas the output period is shorter if the value of the AC voltage is small, and
an overlapping period of the output period and the input period is maximum by adjusting the time difference between the end time point of the output period and the start time point of the input period,
wherein the converter converts alternating current input to the PFC-added AC-DC-converter and outputs the converted direct current or alternating current from the succeeding-converter.

6. A control circuit controlling operation of a converter, the converter comprising:
a power factor correction (PFC)-added AC-DC-converter having a power factor improvement circuit intermittently outputting current which raises and rectifies AC voltage, while improving a power factor through switching pulse width modulation (PWM) control;
a capacitor for smoothing the current output from the power factor improvement circuit; and
a succeeding-converter having a full bridge circuit to which the current smoothed by the capacitor is intermittently input, the converter converting alternating current input to the PFC-added AC-DC-converter and outputting the converted direct current or alternating current from the succeeding-converter, wherein the control circuit controls switching of the power factor improvement circuit and the full bridge circuit so that an end time point of an output period during which current is output from the power factor improvement circuit has a time difference with a start time point of an input period during which current is input to the full bridge circuit, the output period is longer if a value of the AC voltage is large, whereas the output period is shorter if the value of the AC voltage is small, and an overlapping period of the output period and the input period is maximum by adjusting the time difference between the end time point of the output period and the start time point of the input period.

* * * * *